(12) United States Patent
Keigley

(10) Patent No.: US 7,055,698 B1
(45) Date of Patent: Jun. 6, 2006

(54) ROCK SEPARATOR

(76) Inventor: Kevin V. Keigley, 10880 McKinley Hwy., Osceola, IN (US) 46561

( * ) Notice: Subject to any disclaimer, the term of this patent is extended or adjusted under 35 U.S.C. 154(b) by 216 days.

(21) Appl. No.: 10/684,976

(22) Filed: Oct. 10, 2003

Related U.S. Application Data

(60) Provisional application No. 60/417,527, filed on Oct. 10, 2002.

(51) Int. Cl.
*B07B 1/00* (2006.01)
(52) U.S. Cl. ...................................... 209/421; 209/420
(58) Field of Classification Search ................ 209/325, 209/420, 421, 418, 419, 233, 412, 405
See application file for complete search history.

(56) References Cited

U.S. PATENT DOCUMENTS

| | | | |
|---|---|---|---|
| 3,072,257 A * | 1/1963 | Hockenberry | 171/132 |
| 3,596,764 A * | 8/1971 | Smith | 209/421 |
| 4,157,956 A * | 6/1979 | Robinson | 209/260 |
| 4,303,507 A * | 12/1981 | Smith | 209/252 |
| 4,698,150 A * | 10/1987 | Wigoda | 209/421 |
| 5,160,034 A * | 11/1992 | Potter | 209/38 |
| 5,479,726 A * | 1/1996 | Bishop | 37/142.5 |
| 6,059,119 A * | 5/2000 | Davis | 209/233 |
| 6,334,538 B1 * | 1/2002 | Nettles | 209/418 |

FOREIGN PATENT DOCUMENTS

FR 2612966 A1 * 9/1988

* cited by examiner

*Primary Examiner*—Donald P. Walsh
*Assistant Examiner*—Kaitlin Joerger
(74) *Attorney, Agent, or Firm*—Botkin & Hall, LLP

(57) ABSTRACT

A rock separator for attachment to the boom arms of a tractor or skid steer having a bucket sieve and an apron. As the rock separator is pushed over the ground, the apron grid scoops soil and rock over the apron and into the bucket sieve. Openings through both the apron and the bucket sieve allow dirt and smaller soil particles to pass back onto the ground while retaining larger rocks. Wheels on the bucket sieve for engaging the ground as the rock separator is pushed along the ground allow for easy control of the depth and angle of attack of the apron into the ground.

7 Claims, 7 Drawing Sheets

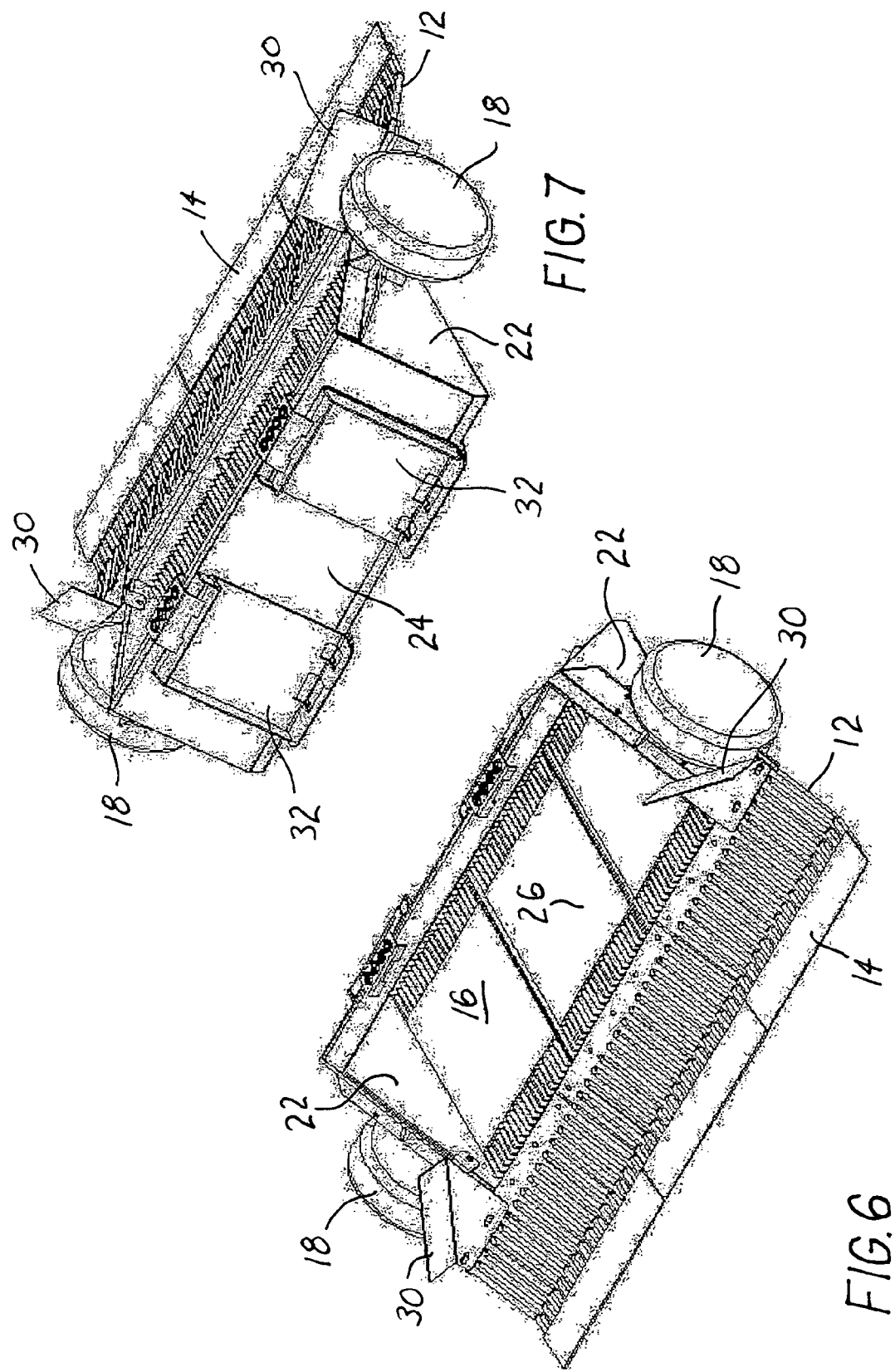

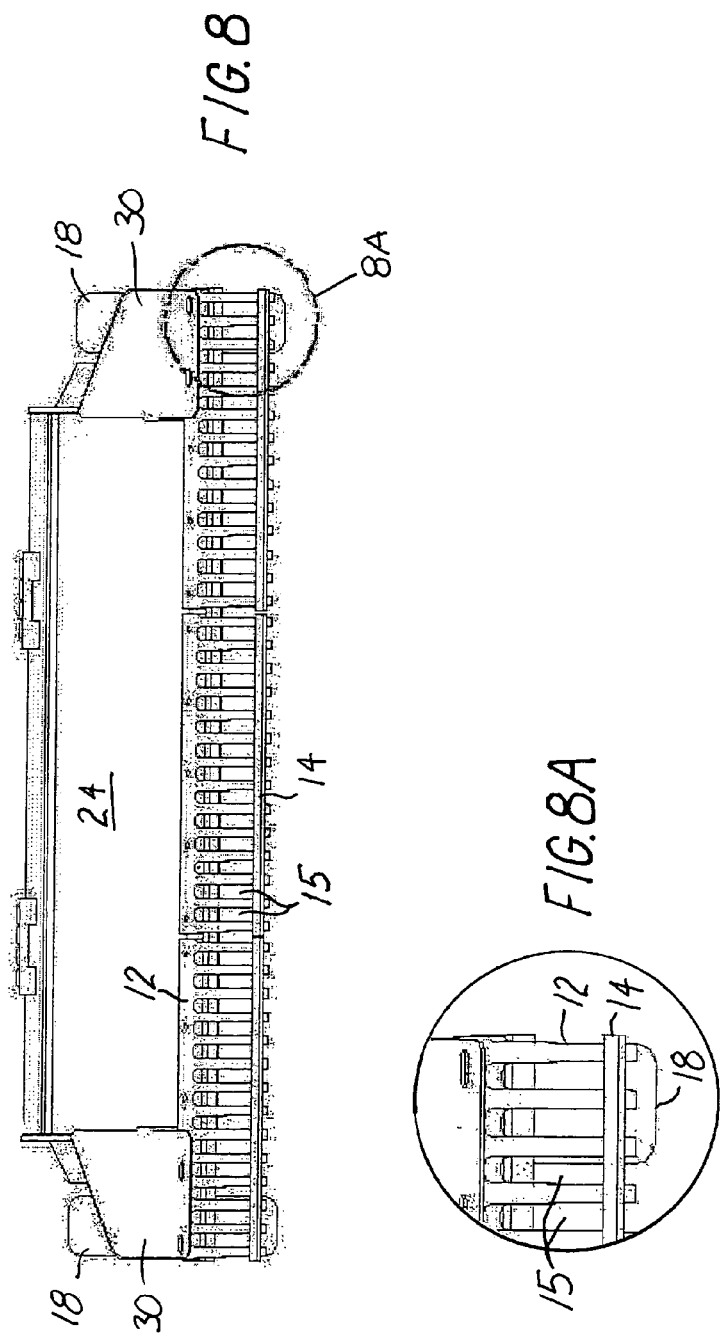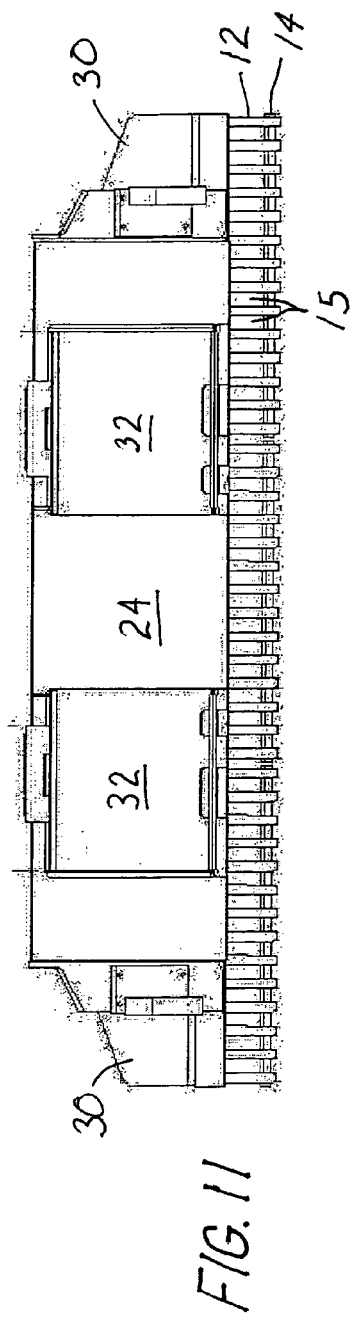

ROCK SEPARATOR

CROSS REFERENCE TO RELATED APPLICATIONS

This application is a continuation of and claims the benefit of Provisional U.S. Patent Application No. 60/417,527, filed Oct. 10, 2002.

BACKGROUND OF THE INVENTION

1. Field of the Invention

The invention disclosed herein relates to a landscaping implement attached to the boom arms of a tractor or other similar drive vehicle for separating rocks from soil.

2. Discussion of Background Art

When preparing fields for cultivation or planting, it is necessary on many occasions to remove rocks and other debris from the dirt. This may be accomplished by time-consuming raking and hand picking or through the use of mechanical raking devices. It would be advantageous to have a device for collecting rocks from the soil which may be operated with a tractor or skid steer.

SUMMARY OF THE INVENTION

The rock separator of this invention may be attached to the boom arms of a tractor device such as a skid steer loader. The separator includes a bucket sieve, which has mounted at its leading edge a combination apron grid and blade. A pair of wheels support the bucket sieve so as to allow the apron grid to pass closely over the ground with its blade making contact in a scraping, scooping, or scarifying action. This movement of the blade causes the rocks and some dirt to be lifted onto the apron grid where at least a portion of the uplifted dirt falls through the apron grid back onto the ground. The bucket sieve and apron are then tilted rearwardly which throws or rolls the rocks and any dirt on the apron grid into the bucket sieve where the remaining dirt passes through the bucket sieve and onto the ground. Once the scraping action is completed, the bucket sieve with its rocks may be placed in a conveyance such as a dump truck by tilting the bucket sieve so as to empty the rocks into the awaiting truck bed.

An object of the invention is to provide a device for attachment to the boom arms of a tractor, skid steer, or other similar drive vehicle which will separate rocks from soil.

BRIEF DESCRIPTION OF THE DRAWINGS

These and other aspects of the invention will be apparent from the following description, with reference to the accompanying drawings, in which:

FIG. 6 is front perspective view of the rock separator;

FIG. 7 is a rear perspective view of the rock separator;

FIG. 8 is a front view of the rock separator with FIG. 8A showing a detailed view of the circled portion 8A indicated in FIG. 8;

FIG. 11 is a rear view of the rock separator without the wheels attached.

DETAILED DESCRIPTION

Figure 1:
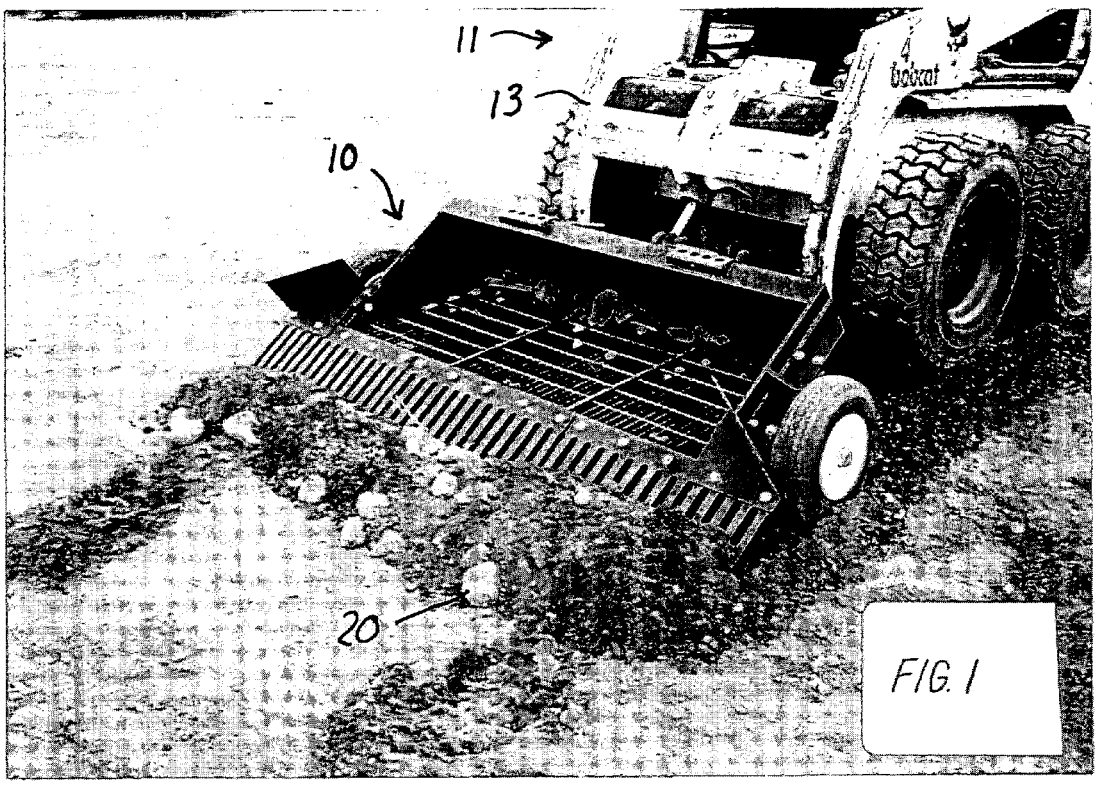
FIG. 1 is a perspective view of a rock separator of this invention attached to the boom arms of a skid steer with the rock separator in a lowered position tilted forward or downwardly to engage soil and rocks.

Referring now to the drawings, a rock separator 10 of this invention is connected to a skid steer loader or similar tractor device 11 which, through tilt arms or booms 13, enables the separator to be raised and lowered and tilted forward, or downwardly, and rearward, or upwardly. Separator 10 includes a bucket sieve 16 and an apron grid 12 at the leading or forward edge of the bucket sieve. Bucket sieve 16 includes sidewalls 22 and rear wall 24 and a sieve bottom 26. Both apron grid 12 and bucket sieve 16 have slotted openings 15 which allow dirt and smaller particles to pass through, but which are sized to retain larger rocks 20. A transverse blade 14 is connected across the forward or leading edge of apron grid 12 for scooping soil and rocks onto apron grid 12. Blade 14 and the leading edge of apron grid 12 are preferably angled so as to be substantially horizontal when rock separator 10 is in its scarifying position described more fully below. A pair of guide chutes 30 located on opposite ends of apron grid 12 guide soil and rocks along the outside edges of the apron grid into the bucket sieve 16, allowing the apron grid to be wider than the bucket sieve. Mounting parts 32 located on the rear wall 24 of bucket sieve 10 are adapted for mounting rock separator to boom arms 13 of skid steer 11.

A pair of wheels 18 are journalled on each side of bucket sieve 16. Wheels 18 are carried within one of a plurality of spaced apart axle sockets 28 such that the wheels may be selectively carried within any one of the axle sockets. Axle sockets 28 are angularly aligned with respect to sieve bottom 24 so that wheels may be adjusted both vertically and horizontally relative to the sieve bottom. In this manner, the orientation of bucket sieve 10 relative to the underlying ground can be adjusted and easily maintained by both adjusting the position of wheels 18 within wheel sockets 28 and by tilting the bucket sieve around wheels 18 when the rock separator rests on the ground. Wheels 18 allow the apron grid 12 and its blade 14 to hug or closely pass over the ground at a relatively constant depth or elevation. In this manner, the operation of rock separator 10 is simplified by reducing the amount of skill and attention required to operate the rock separator.

Figure 2:
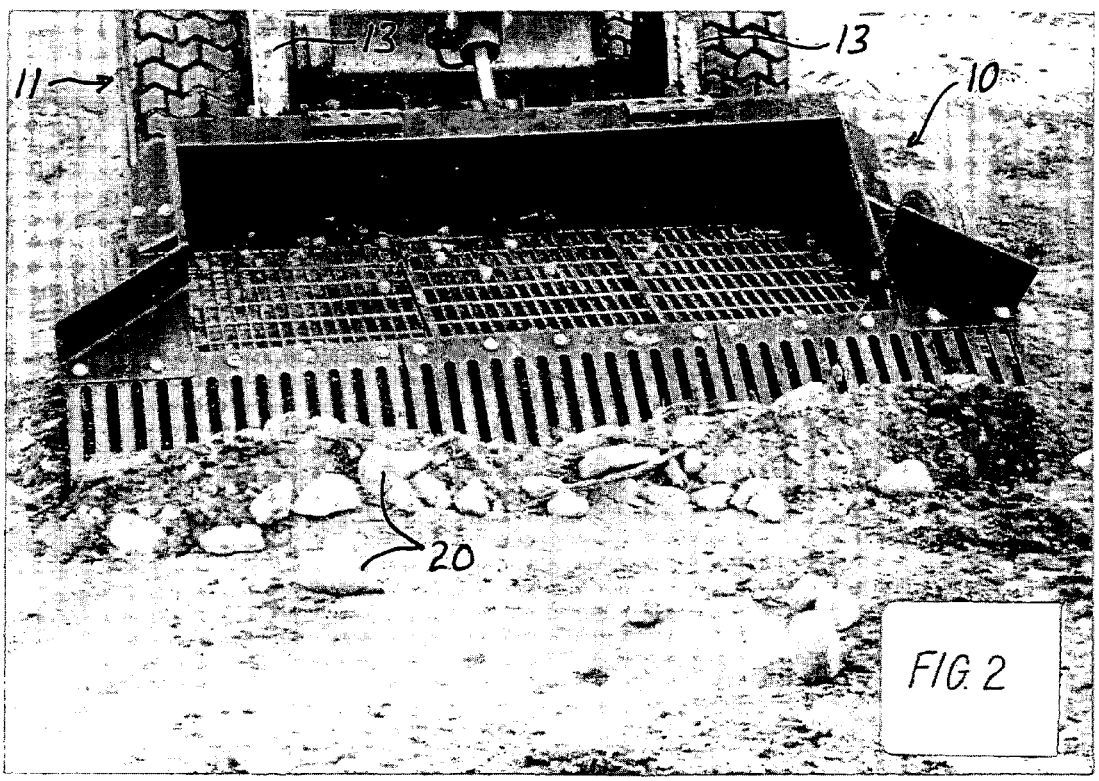
FIG. 2 is a front view of the rock separator of FIG. 1.
Figure 3:
FIG. 3 is a side view of the rock separator of FIG. 1.
Figure 4:
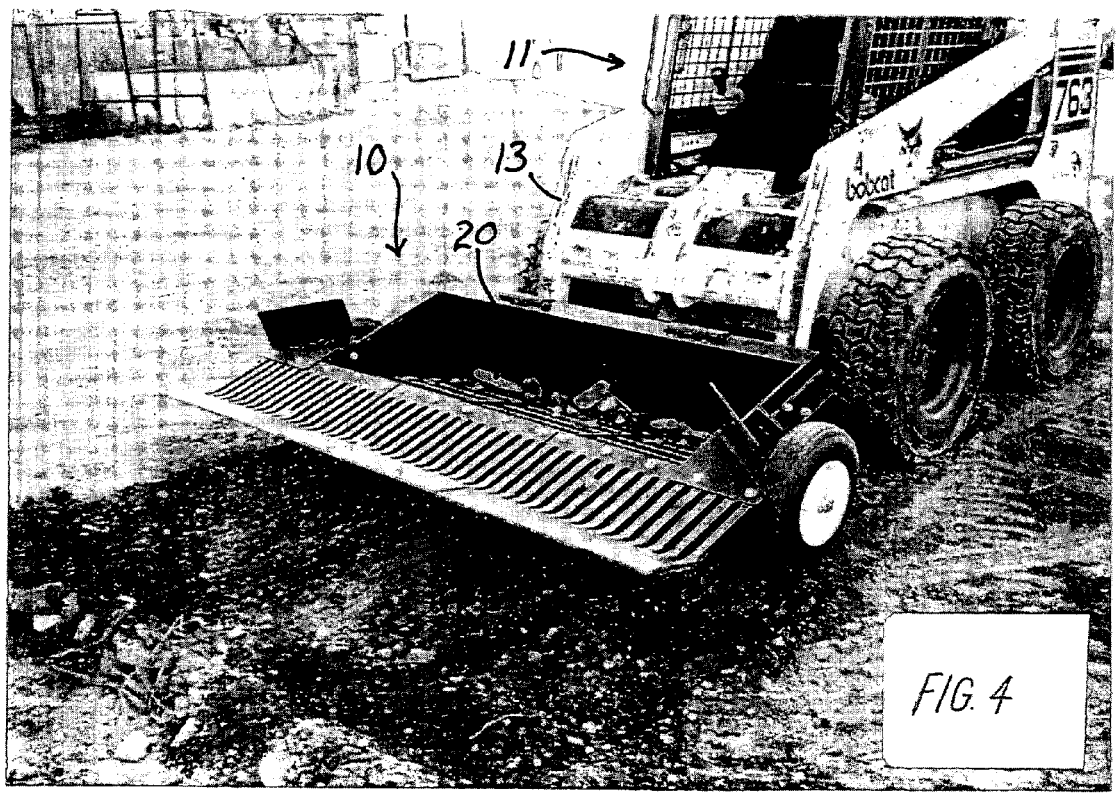
FIG. 4 is a perspective view of the rock separator of FIG. 1 with the rock separator in a lowered position tilted rearward or upwardly with separated rocks within the bucket sieve.
Figure 5:
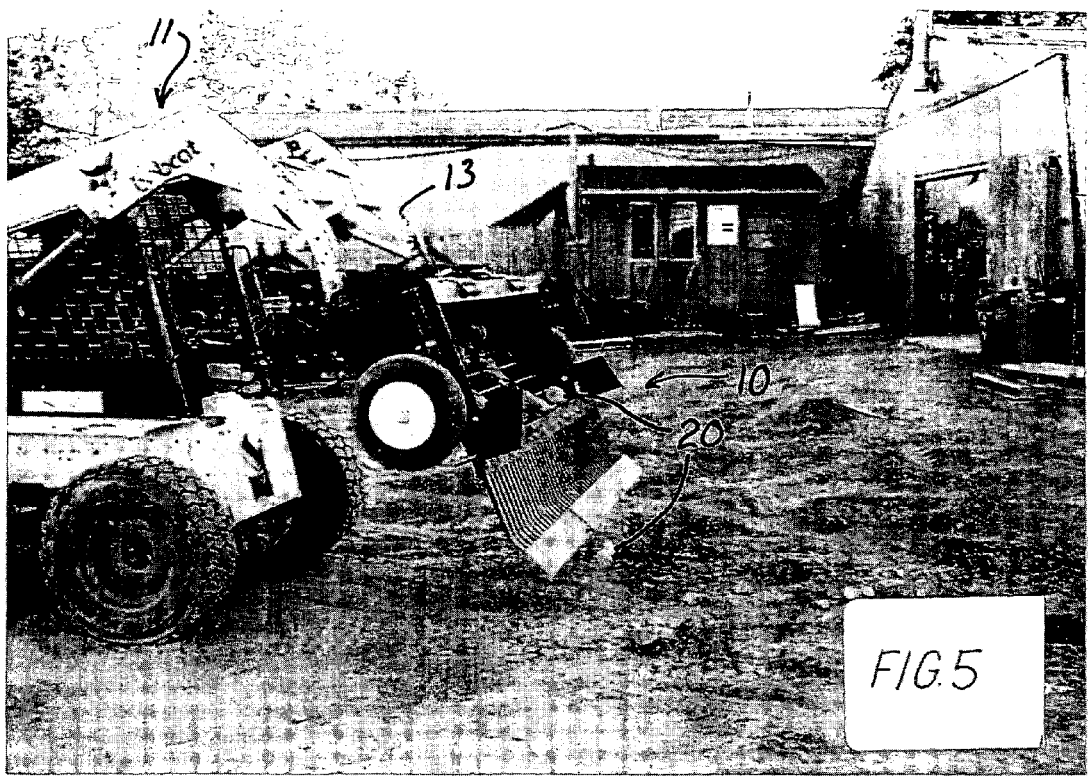
FIG. 5 is a side view of the rock separator of FIG. 1 with the rock separator in a raised position tilted forward to unload collected rocks from the bucket sieve.
Figure 9A:
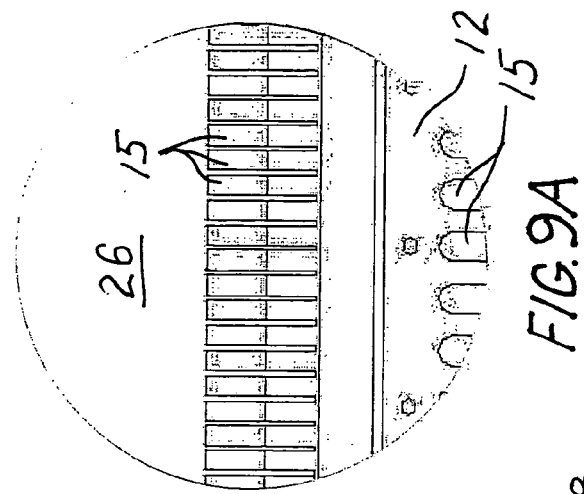
FIG. 9 is a top view of the rock separator with FIG. 9A showing a detailed view of the circled portion 9A indicated in FIG. 9.
Figure 9:
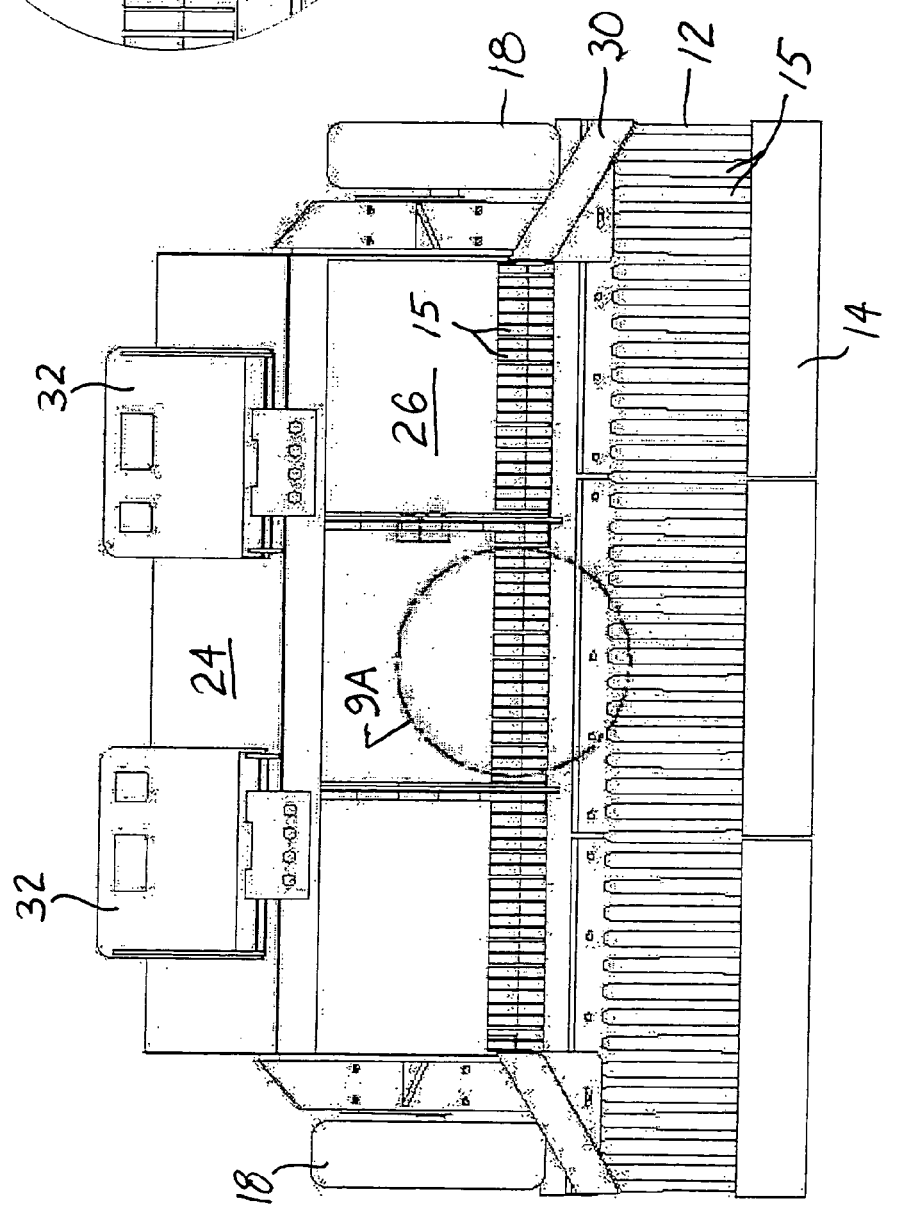
Figure 10:
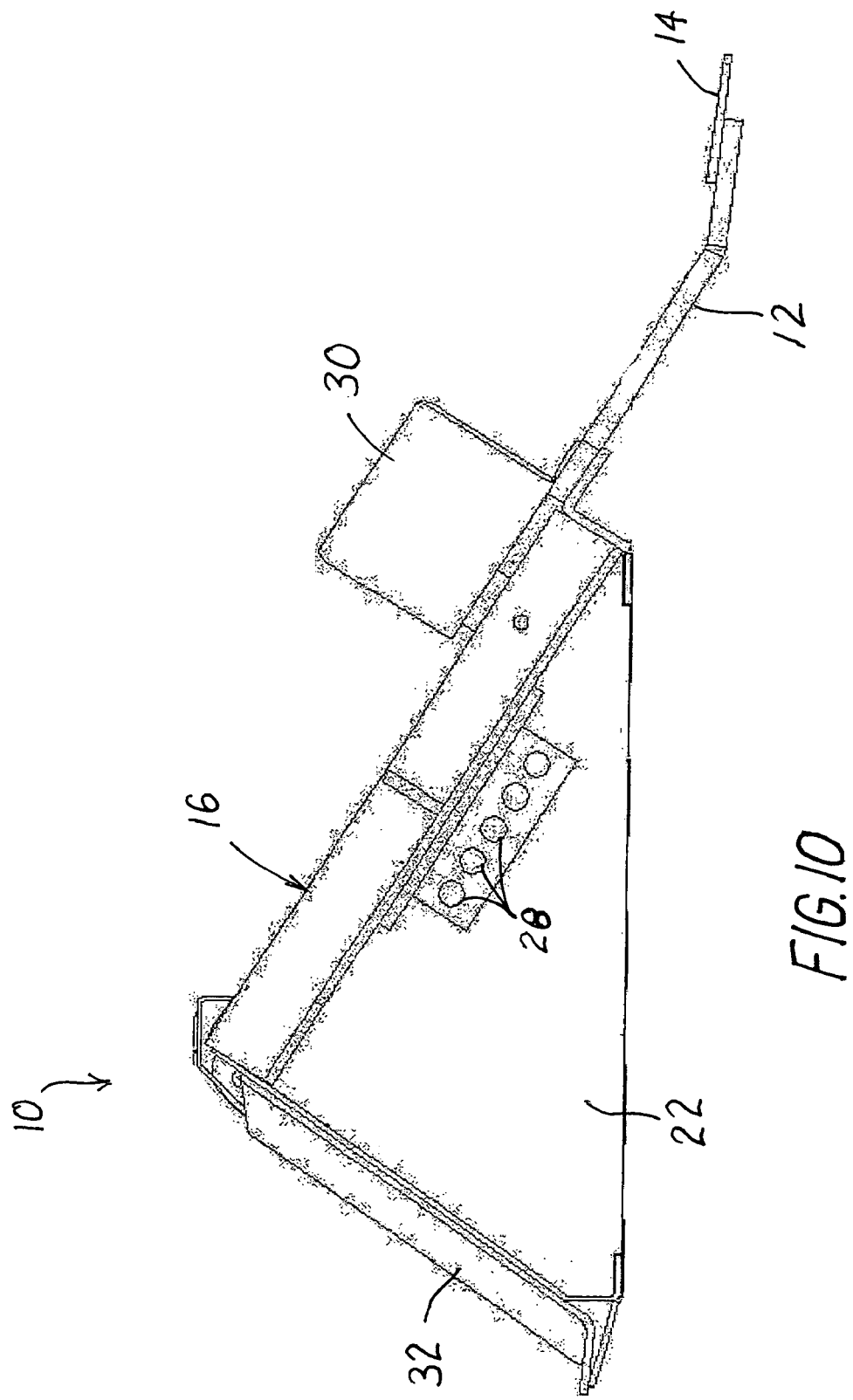
FIG. 10 is a side view of the rock separator without the wheels attached.

Separator 10 has three main operating positions: a raking position shown in FIGS. 1–3, a collection position shown in FIG. 4, and a dumping position shown in FIG. 5. In its raking position, rock separator 10 is lowered so that wheels 18 engage the ground and is tilted forwardly so that blade 14 engages the soil. Rock separator 10 is then pushed forward by skid steer 11 with wheels 18 propelled along the top of the ground and blade 14 extending just under the surface of the underlying soil, dislodging and scooping up stones and soil which ride over the blade and onto the apron grid as the rock separator moves forwardly. Dirt and smaller particles which accompany the rocks falls through the slotted openings 15 of apron grid 12 and back onto the ground. Larger rocks 20 are retained on apron grid 12 and may be pushed further back into bucket sieve 16 as rock separator 10 is pushed along the ground. When grid 12 accumulates a sufficient number of rocks, rock separator 10 is tilted upwardly into its collection position to cause the rocks and any remaining dirt to fall into the bucket sieve 16. In bucket sieve 16, any remaining dirt falls through slotted openings 15 in sieve bottom 26 and larger rocks 20 are accumulated within the bucket sieve. To facilitate the separation of the dirt from the rocks either upon apron grid 12 or within bucket sieve 16, separator 10 may be shaken by the tractor or loader operator. When enough rocks have been collected within bucket sieve 16, separator 10 may be lifted using boom arms 13, and moved to a position over a receptacle, such as the bed of a dump truck, where the rock separator may be tilted forwardly and downwardly into its dumping position to allow the rocks to fall from the bucket sieve into the awaiting truck. The separator then may be lowered until its wheels again contact the underlying ground and the raking action for any remaining rocks continued. The depth or elevation by which the blade 14 passes over or into the soil and its angle of attack into the soil can be adjusted by adjusting the vertical orientation of the wheels relative to bucket sieve 16 and the rotation or angle of the bucket sieve around the wheels relative to the ground.

The detailed description related herein is only meant to exemplify the preferred embodiment of the invention to enable those skilled in the art to make and use it. The subject invention is not to be limited to the details given above for the preferred embodiment, but may be modified within the scope of the impending claims.

I claim:

1. A separator for rocks upon the ground, said separator comprising a buckets sieve and an attached apron grid, said apron grid including a transverse blade, wheels supporting said bucket sieve, said grid having openings sized to retain said rocks and allow soil to pass therethrough between said sieve and said blade for engaging said ground to lift said rocks therefrom and onto said apron grid, said separator being tiltable to cause the rocks upon said apron grid to fall into said bucket sieve, said separator adapted for attachment to a hitch apparatus of a drive vehicle.

2. An implement for engagement with the ground to separate rocks from soil, said implement adapted for attachment to a hitch apparatus of a drive vehicle, said hitch apparatus capable of controlling vertical and pivotal movement, wherein said implement comprises: a bucket sieve having an open end, a closed end, and a floor between the open end and the closed end; said floor having first openings sized to retain rocks and allow soil to pass therethrough; hitch parts for attachment to said hitch apparatus along said closed end; an apron extending from said bucket sieve along said open end; said apron for engagement with said ground to scoop and direct said soil and rocks toward said bucket sieve; wheels journalled to opposite ends of said bucket sieve for engagement with said ground, said apron having second openings sized to retain rocks and allow soil to pass therethrough, said apron including a blade located opposite said open end of said bucket sieve, said blade for engagement with the ground, said second openings located between said blade and said open end of said bucket sieve.

3. The implement of claim 2 wherein said wheels are rotatable about a common axis located between said apron and said hitch parts.

4. The implement of claim 3 wherein said wheels may be selectively placed in a plurality of vertically spaced positions relative said bucket sieve.

5. The implement of claim 4 wherein said wheels may be selectively placed in a plurality of horizontally spaced positions relative said bucket sieve.

6. The implement of claim 2 wherein said apron is angled downwardly from said open end of the bucket sieve, said blade is angled upwardly from said apron forming a scooping means.

7. The implement of claim 2 and further including guide parts located on said apron for guiding said soil and rocks into the bucket sieve.

* * * * *